(12) United States Patent
Hao (10) Patent No.: US 10,085,499 B2
(45) Date of Patent: Oct. 2, 2018

(54) SEAMLESS POLYETHYLENE BASED DISPOSABLE GLOVES AND METHOD OF MANUFACTURING THE SAME

(71) Applicant: Gang Hao, Corona, CA (US)

(72) Inventor: Gang Hao, Corona, CA (US)

(*) Notice: Subject to any disclaimer, the term of this patent is extended or adjusted under 35 U.S.C. 154(b) by 275 days.

(21) Appl. No.: 15/141,732

(22) Filed: Apr. 28, 2016

(65) Prior Publication Data

US 2017/0311665 A1   Nov. 2, 2017

(51) Int. Cl.
*B32B 27/08* (2006.01)
*B32B 27/00* (2006.01)
*B32B 9/04* (2006.01)
*A41D 19/00* (2006.01)

(52) U.S. Cl.
CPC ..... *A41D 19/0082* (2013.01); *A41D 19/0006* (2013.01); *A41D 2400/52* (2013.01)

(58) Field of Classification Search
CPC ............ A41D 19/0082; A41D 2400/52; A41D 19/0006
USPC ...................................... 428/515, 500, 411.1
See application file for complete search history.

(56) References Cited

U.S. PATENT DOCUMENTS

| | | | |
|---|---|---|---|
| 4,038,787 A | 8/1977 | Bianchi | |
| 5,210,880 A | 5/1993 | Yale | |
| 5,442,816 A | 8/1995 | Seketa | |
| 5,467,484 A | 11/1995 | Drescher et al. | |
| 6,381,753 B1 | 5/2002 | Smith et al. | |
| 7,033,100 B2 | 4/2006 | Barton et al. | |
| 7,356,852 B2 | 4/2008 | Thai | |
| 7,487,553 B2 | 2/2009 | Price | |
| 7,937,773 B1 | 5/2011 | Kleinert | |
| 8,225,427 B2 | 7/2012 | Bevier | |
| 8,448,265 B2 | 5/2013 | DuPont | |
| 2005/0183186 A1 | 8/2005 | Hanada et al. | |
| 2006/0041991 A1 | 3/2006 | Kim Sim | |
| 2008/0226920 A1* | 9/2008 | Parkinson | B32B 27/08 428/411.1 |
| 2010/0083420 A1 | 4/2010 | Bouckaert | |
| 2011/0030121 A1 | 2/2011 | Smalls | |
| 2011/0198777 A1 | 8/2011 | Liou | |
| 2012/0030857 A1 | 2/2012 | Farago et al. | |
| 2012/0047626 A1 | 3/2012 | Johnson | |
| 2013/0015191 A1 | 1/2013 | Seagle et al. | |
| 2013/0067638 A1 | 3/2013 | Patkov | |
| 2013/0074454 A1* | 3/2013 | Babrowicz | B32B 7/02 53/467 |
| 2013/0318684 A1 | 12/2013 | Mintoft | |
| 2015/0102519 A1 | 4/2015 | Lipinski et al. | |
| 2017/0036425 A1* | 2/2017 | Zhao | C08K 5/20 |

FOREIGN PATENT DOCUMENTS

WO   WO 2012/027408 A2   3/2012
WO   2015-192267   * 12/2015

OTHER PUBLICATIONS

International Search Report and Written Opinion dated Aug. 1, 2017 for corresponding PCT Application No. US17/30040 (9 pages).

* cited by examiner

*Primary Examiner* — Jessica Whiteley
(74) *Attorney, Agent, or Firm* — Lewis Roca Rothgerber Christie LLP (57) ABSTRACT

A seamless polyethylene based glove includes at least 55 wt % of polyethylene. A method of manufacturing seamless polyethylene based disposable gloves includes: forming a curtain of molten polyethylene based material; inserting a plurality of hand molds into the curtain of molten polyethylene based material; and withdrawing the hand molds from the curtain of molten polyethylene based material.

32 Claims, 8 Drawing Sheets

SEAMLESS POLYETHYLENE BASED DISPOSABLE GLOVES AND METHOD OF MANUFACTURING THE SAME

FIELD

The following description relates generally to seamless polyethylene based disposable gloves and the method of making the same. In particular, it relates to seamless polyethylene based disposable gloves manufactured utilizing an extrusion process.

BACKGROUND

Disposable gloves have been widely utilized in medical, industrial, clean room, food and other applications. The disposable gloves are classified as nitrile gloves, vinyl gloves, natural rubber gloves, neoprene gloves, polyethylene gloves, etc., according to the material they are made of. There are two typical methods of manufacturing the disposable gloves, and these methods are: (method 1) dipping a hand mold into a tank of liquid glove-forming compounds, followed by processes such as drying and vulcanizing; and (method 2) forming a thin film utilizing the glove-forming compound, and heat sealing two layers of the thin film utilizing a hand-shaped heat seal stamp.

Among the various materials for making disposable gloves, polyethylene is desired for its water-resistance performance, biodegradability, health and economic reasons, etc. Unlike other kinds of disposable gloves, polyethylene gloves have been made utilizing the heat seal process (method 2). In the heat seal process, two layers of polyethylene films (made through an extrusion process, such as slit-die extrusion, blown-film extrusion, etc.) are first laminated together. Then a hand-shaped heat seal stamp with the contour of a hand cuts through the films while concurrently melts the edges of the cut films to heat seal the edges of the two films together (except for the edge corresponding to the wrist or arm of a wearer), thereby forming a glove with a seam along the contour of the hand. As the two layers of films are connected together at the seam, current polyethylene disposable gloves suffer from weak mechanical strength along the seams. In fact, polyethylene disposable gloves often fail a test when high pressure is applied to the inside of the glove due to its broken seam. In addition, because the films are typically made at one station, and the heat seal process is conducted at another station, or even at a different location, the heat seal process takes extra space and processing time.

SUMMARY

Aspects according to one or more embodiments of the present invention are directed toward seamless polyethylene based disposable gloves and method of making the same.

Additional aspects will be set forth in part in the description which follows, and, in part, will be apparent from the description, or may be learned by practice of the presented embodiments.

According to an embodiment of the present invention, a seamless polyethylene based glove includes at least 55 wt % of polyethylene.

The seamless polyethylene based glove may have a thickness of about 0.01 mm to about 0.5 mm. In one embodiment, the seamless polyethylene based glove may have a thickness of about 0.02 mm to about 0.3 mm. In another embodiment, the seamless polyethylene based glove may have a thickness of about 0.03 mm to about 0.15 mm.

The seamless polyethylene based glove may have a uniform thickness.

The seamless polyethylene based glove may sustain a load of about 2000 g water in a pinhole test.

The seamless polyethylene based glove may be made of a material selected from the group consisting of low density polyethylene (LDPE), linear low density polyethylene (LLDPE), medium density polyethylene (MDPE), high density polyethylene (HDPE), polyethylene copolymer, and combinations thereof.

The seamless polyethylene based glove may further include at least one of polyoxyethylene (POE), polyisobutylene (PIB), ethylene propylene rubber (EPR), ethylene propylene diene elastomer (EPDM), EPDM by metallocene catalyst, and combinations thereof.

In one embodiment, the seamless polyethylene based glove may be made of a blend of LDPE and LLDPE. In another embodiment, the seamless polyethylene based glove may be made of a blend of LDPE, LLDPE, POE and EPDM.

The seamless polyethylene based glove may further include an additive. The additive may be a pigment, an antimicrobial agent, a processing aid, a UV stabilizer, etc.

The seamless polyethylene based glove may have a texture on at least a portion of the glove. The texture may be on the palm, the finger tips or the whole glove surface.

The seamless polyethylene based glove may include 5 fingers, or may be in the shape of a mitten with one thumb.

According to another embodiment of the present invention, a method of manufacturing seamless thermoplastic material based disposable gloves includes forming a curtain of molten thermoplastic material based material; inserting a plurality of hand molds into the curtain of molten thermoplastic material based material; and withdrawing the hand molds from the curtain of molten thermoplastic material based material. In one embodiment, the thermoplastic material is selected from acrylics, fluorocarbons, polyurethane, polystyrene, acrylonitrile butadiene styrene (ABS), polyamide, polylactic acid, polycarbonate, polyether sulfone, polyetherimide, polyolefin, polyvinyl chloride, and combinations thereof. In another embodiment, the thermoplastic material is polyethylene.

The method may further include rotating each of the plurality of hand molds greater than 90 degrees prior to the withdrawing of the hand mold.

The method may further include rotating each of the plurality of hand molds 180 degrees prior to the withdrawing of the hand mold.

The polyethylene based material may be selected from the group consisting of low density polyethylene, linear low density polyethylene, medium density polyethylene, high density polyethylene, polyethylene copolymer, and a mixture thereof. The seamless polyethylene based glove may further include at least one of polyoxyethylene (POE), polyisobutylene (PIB), ethylene propylene rubber (EPR), ethylene propylene diene elastomer (EPDM), EPDM by metallocene catalyst, and combinations thereof.

A temperature difference between a temperature of the molten polyethylene based material and a temperature of the hand mold may be about 2 to about 100° C. In one embodiment, the temperature difference may be about 20 to about 70° C.

The method may further include solidifying the molten polyethylene based material on the hand mold.

The hand mold may include a layer of a glove material. The glove material may be selected from the group consisting of woven fabric, non-woven fabric, polyvinyl alcohol, PVC, nitrile, latex, feather, styrene-butadiene copolymer (SBC), ethylene vinyl acetate (EVA), other ethylene based material, and combinations thereof.

The method may further include removing the solidified polyethylene based material from the hand mold.

The curtain of polyethylene based material may have a first width, and the hand mold may have a second width, wherein a number of the hand mold in a horizontal row may be equal to or less than a quotient of the first width and the second width.

The plurality of hand molds may be arranged in two or more horizontal rows.

The two or more rows of the hand molds may be arranged in a staggered pattern.

The hand mold may include an inner chamber enclosed by a surface of the hand mold, the inner chamber including a heater.

The hand mold may be made of a metal material. The hand mold may be made of copper, aluminum, synthetic material, ceramics, etc.

A surface of the hand mold may be textured. The whole surface of the hand mold may be textured. Only a portion of the surface of the hand mold may be textured. The finger tips may be textured.

BRIEF DESCRIPTION OF THE DRAWINGS

These and other features and advantages of the present invention will be better understood by reference to the following detailed description when considered in conjunction with the accompanying drawings. It is understood that selected structures and features have not been shown in certain drawings so as to provide better viewing of the remaining structures and features.

DETAILED DESCRIPTION

Spatially relative terms, such as "below," "beneath," "lower," "above," "upper," and the like, may be used herein for ease of description to describe one element or feature's relationship to another element(s) or feature(s) as illustrated in the drawings. It will be understood that the spatially relative terms are intended to encompass different orientations of the device in use or operation in addition to the orientation depicted in the drawings. Embodiments described herein will be described referring to plan views and/or cross-sectional views by way of ideal schematic views of the invention. Accordingly, the example views may be modified depending on manufacturing technologies and/or tolerances. Therefore, the embodiments of the invention are not limited to those shown in the views, but include modifications in configuration formed on the basis of manufacturing processes. Therefore, regions shown in the drawings have schematic properties, and shapes of regions shown in the drawings are examples of specific shapes of regions of elements and do not limit aspects of the invention.

The terminology used herein is for the purpose of describing particular example embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Expressions such as "at least one of" or "at least one selected from" when preceding a list of elements, modify the entire list of elements and do not modify the individual elements of the list. Further, the use of "may" when describing embodiments of the present invention refers to "one or more embodiments of the present invention." Also, the term "exemplary" is intended to refer to an example or illustration. It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. In contrast, when an element or layer is referred to as being "directly on," "directly connected to", "directly coupled to", or "immediately adjacent to" another element or layer, there are no intervening elements or layers present.

As used herein, the terms "substantially," "about," and similar terms are used as terms of approximation and not as terms of degree, and are intended to account for the inherent deviations in measured or calculated values that would be recognized by those of ordinary skill in the art. Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Figure 1:
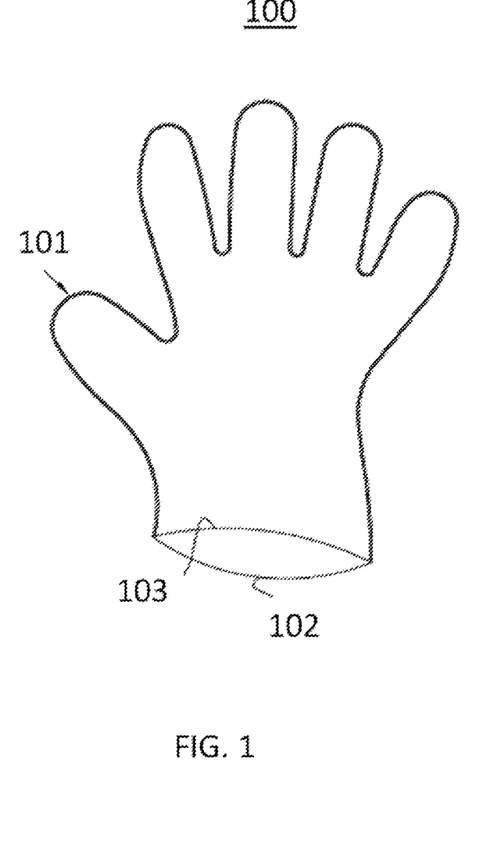
FIG. 1 is a top view of a conventional polyethylene glove manufactured utilizing the heat stamp process.

FIG. 1 is a top view of a comparative polyethylene glove manufactured utilizing the heat stamp process. Referring to FIG. 1, the polyethylene disposable glove 100 includes a seam 101 around the contour of the glove, where a first polyethylene film 102 and a second polyethylene film 103 are joined together through the heat stamp process.

Figure 2:
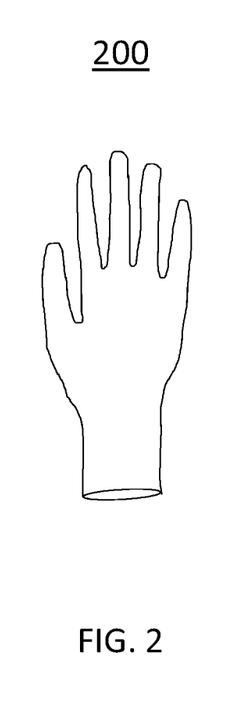
FIG. 2 is a top view of a seamless polyethylene based glove according to an embodiment of the present invention.

FIG. 2 is a top view of a seamless polyethylene based glove according to an embodiment of the present invention.

Referring to FIG. 2, the polyethylene based glove 200 is free of any seams. The polyethylene based glove 200 may have the shape of a user's hand. The seamless polyethylene based glove may include at least 55 wt % of polyethylene. For example, the seamless polyethylene based glove may include at least 60 wt %, 70 wt %, 80 wt % or 90 wt % of polyethylene. Here, the term "polyethylene based" refers to a polyethylene content of at least 55% based on the total weight of the glove forming materials (e.g., based on the total weight of the glove).

The seamless polyethylene based glove may be made of a material selected from low density polyethylene (LDPE), linear low density polyethylene (LLDPE), medium density polyethylene (MDPE), high density polyethylene (HDPE), polyethylene copolymer, and a combination thereof. The seamless polyethylene based glove may further include at least one selected from polyoxyethylene (POE), polyisobutylene (PIB), ethylene propylene rubber (EPR), ethylene propylene diene elastomer (EPDM), EPDM by metallocene catalyst, and combinations thereof.

In one embodiment, the seamless polyethylene based glove may be made of a blend of LDPE and LLDPE. In another embodiment, the seamless polyethylene based glove may be made of a blend of LDPE, LLDPE, POE and EPDM.

In one embodiment, the seamless polyethylene based glove may include two or more layers laminated together. For example, the seamless polyethylene based glove may include a first layer of polyethylene based material and a second layer of the same or different material. In one embodiment, the second layer is formed of a woven fabric, a non-woven fabric, polyvinylchloride (PVC), polyvinyl alcohol, nitrile, latex, feather, styrene-butadiene copolymer (SBC), ethylene vinyl acetate (EVA), other polyethylene based material, etc.

The seamless polyethylene based glove may be made of a polyethylene having a weight average molecular weight of about 28,000 to about 1,000,000, or from about 50,000 to about 500,000. In one embodiment, the elastic modulus of the seamless polyethylene based glove may be about 10 MPa to about 20 MPa, for example, about 10.5 MPa to about 18 MPa. The seamless polyethylene based glove may have a uniform elastic modulus throughout the glove (e.g., irrespective of the location of the sampling on the glove), while in a comparable polyethylene based glove made of the heat stamp process, the elastic modulus at the seam portion of the glove is lower, for example, 2 to 5 MPa lower, than that in the palm area of the glove.

The seamless polyethylene based glove may further include an additive. The additive may be a pigment, an antimicrobial agent, a processing aid, and/or a UV stabilizer.

The seamless polyethylene based glove may have a thickness of about 0.01 mm to about 0.5 mm. For example, the seamless polyethylene based glove may have a thickness of about 0.01 mm to about 0.4 mm, about 0.05 mm to about 0.3 mm, or about 0.05 to about 0.2 mm. In one embodiment, the seamless polyethylene based glove may have a thickness of about 0.06 mm to about 0.08 mm. The seamless polyethylene based glove may have a uniform thickness. The seamless polyethylene based glove may have a weight of about 0.2 g to about 10 g, for example, about 0.5 g to about 3 g.

Comparable polyethylene gloves manufactured utilizing the heat stamp process may not sustain a pressure required for application in the medical field. For example, in a pinhole test, 1000 g of water is filled inside of a glove, and the comparable polyethylene gloves manufactured utilizing the heat stamp process usually fails due to a bursting seam.

According to an embodiment of the present invention, a seamless polyethylene based glove may sustain a load of at least about 1000 g water or a load of at least about 1200 g water. In one embodiment, a seamless polyethylene based glove may sustain a load of about 2000 g water. According to another embodiment of the present invention, a seamless polyethylene based glove may sustain a pressure of about 0.1 MPa in the pinhole test. According to another embodiment of the present invention, a seamless polyethylene based glove may sustain a pressure of about 0.1 kPa in the pinhole test.

The seamless polyethylene based glove may have a texture on at least a portion of the gloves. The texture may be on the palm (e.g., only on the palm), the fingertips (e.g., only on the fingertips) or the whole glove surface.

Figure 3:
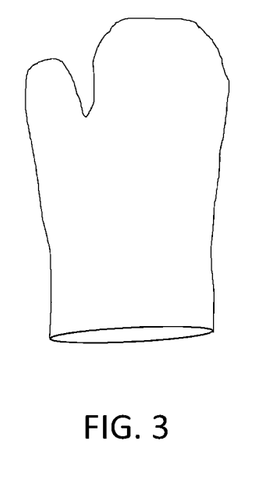
FIG. 3 is a top view of a seamless polyethylene based glove according to an embodiment of the present invention.

The seamless polyethylene based glove may include 5 fingers as shown in FIG. 2, or in the shape of a mitten with one thumb 301, and an integrated portion 302 for accommodating the rest of the fingers of a user's hand, as shown in FIG. 3.

Hereinafter, a process of manufacturing seamless thermoplastic material based gloves will be described in more detail. According to one embodiment, a method of manufacturing a seamless thermoplastic material based disposable glove includes forming a curtain of molten thermoplastic material based material; inserting a plurality of hand molds into the curtain of molten thermoplastic material based material; and withdrawing the hand molds from the curtain of molten thermoplastic material based material. The term "thermoplastic material based material" used herein refers to a composition that includes at least 55% of one or more thermoplastic materials. In one embodiment, the thermoplastic material is selected from acrylics, fluorocarbons, polyurethane, polystyrene, acrylonitrile butadiene styrene (ABS), polyamide, polylactic acid, polycarbonate, polyether sulfone, polyetherimide, polyolefin, polyvinyl chloride, and combinations thereof.

Figure 4:
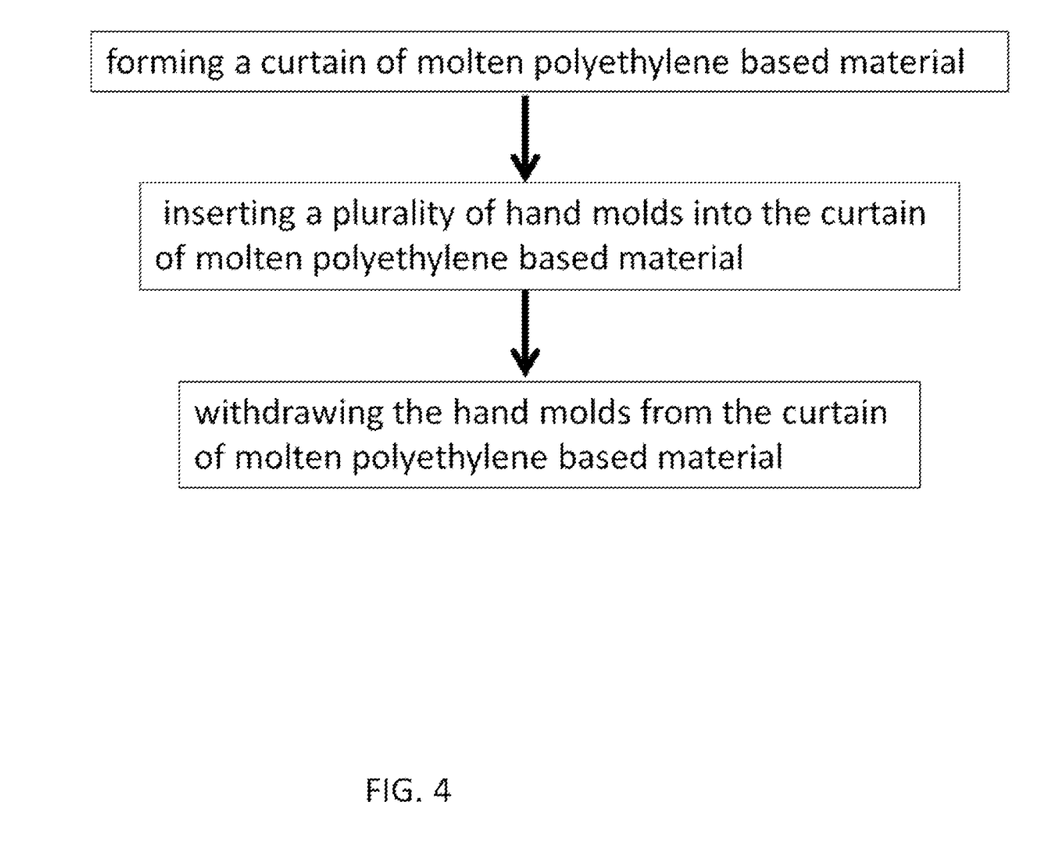
FIG. 4 is a flow chart illustrating a process of manufacturing seamless polyethylene based gloves according to an embodiment of the present invention.

In another embodiment, the thermoplastic material is polyethylene. FIG. 4 is a flow chart illustration of the process of manufacturing seamless polyethylene based gloves according to an embodiment of the present invention. Referring to FIG. 4, a method of manufacturing a seamless polyethylene based disposable glove includes forming a curtain of molten polyethylene based material; inserting a plurality of hand molds into the curtain of molten polyethylene based material; and withdrawing the hand molds from the curtain of molten polyethylene based material.

Figure 5:
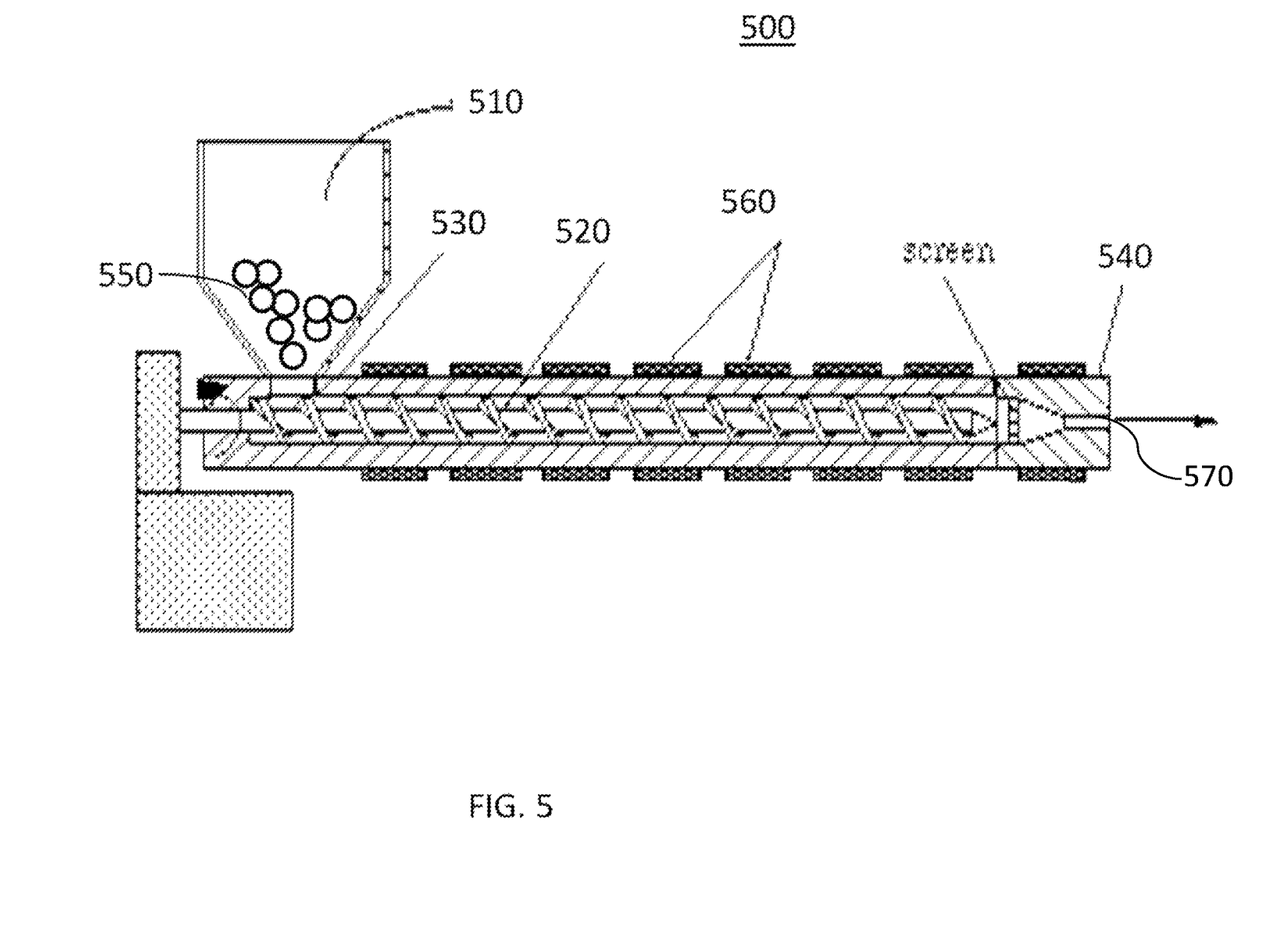
FIG. 5 is a schematic illustration of a slit die extrusion process.

The curtain of molten polyethylene based materials may be formed utilizing any suitable methods. For example, the curtain of molten polyethylene based materials may be formed utilizing an extrusion process. FIG. 5 is a schematic illustration of an extruder. The extruder 500 includes a hopper 510, an extruder screw 520, a barrel 530 to accommodate the extruder screw 520, and a die 540. Polyethylene based resin pellets 550 are gravity fed into the hopper 510, and from the hopper 510 into the extruder screw 520. The extruder screw 520 rotates inside the barrel and the resultant frictional force on the resin pellets causes it to move forward in the barrel. The resin pellets are melted by the frictional heat and conducted heat from the external barrel heaters 560.

After having traveled along the barrel 530, the molten polyethylene based resin passes to the die 540 with a suitable shape. For example, the die 540 may have an opening 570 in the shape of a thin slit. The slit may have a length of about 0.1 m, 0.3 m, 1 m, 2 m, 3 m, or any suitable length, and a width of about 0.01 mm, 0.05 mm, 0.1 mm, 0.5 mm or any suitable width. The molten polyethylene based resin is then forced through the die opening adopting the shape of the slit and allowed to flow downward forming a curtain of molten polyethylene based material. The molten polyethylene based material may be flowing at a speed of about 0.01 m/s to about 5 m/s, for example, about 0.1 m/s to about 4 m/s. In one embodiment, the molten polyethylene based material may be flowing at a speed of about 1.17 m/s.

In one embodiment, the curtain of molten polyethylene based material may have a temperature of about 150° C. to about 320° C. For example, the curtain of molten polyethylene based material may have a temperature of about 250° C. to about 300° C.

As the plurality of hand molds are inserted into the curtain of molten polyethylene based material, the molten polyethylene based material is coated on the hand mold. Once the hand mold is withdrawn from the curtain of molten polyethylene based material, a layer of polyethylene based material is formed over the hand mold.

Figure 6:
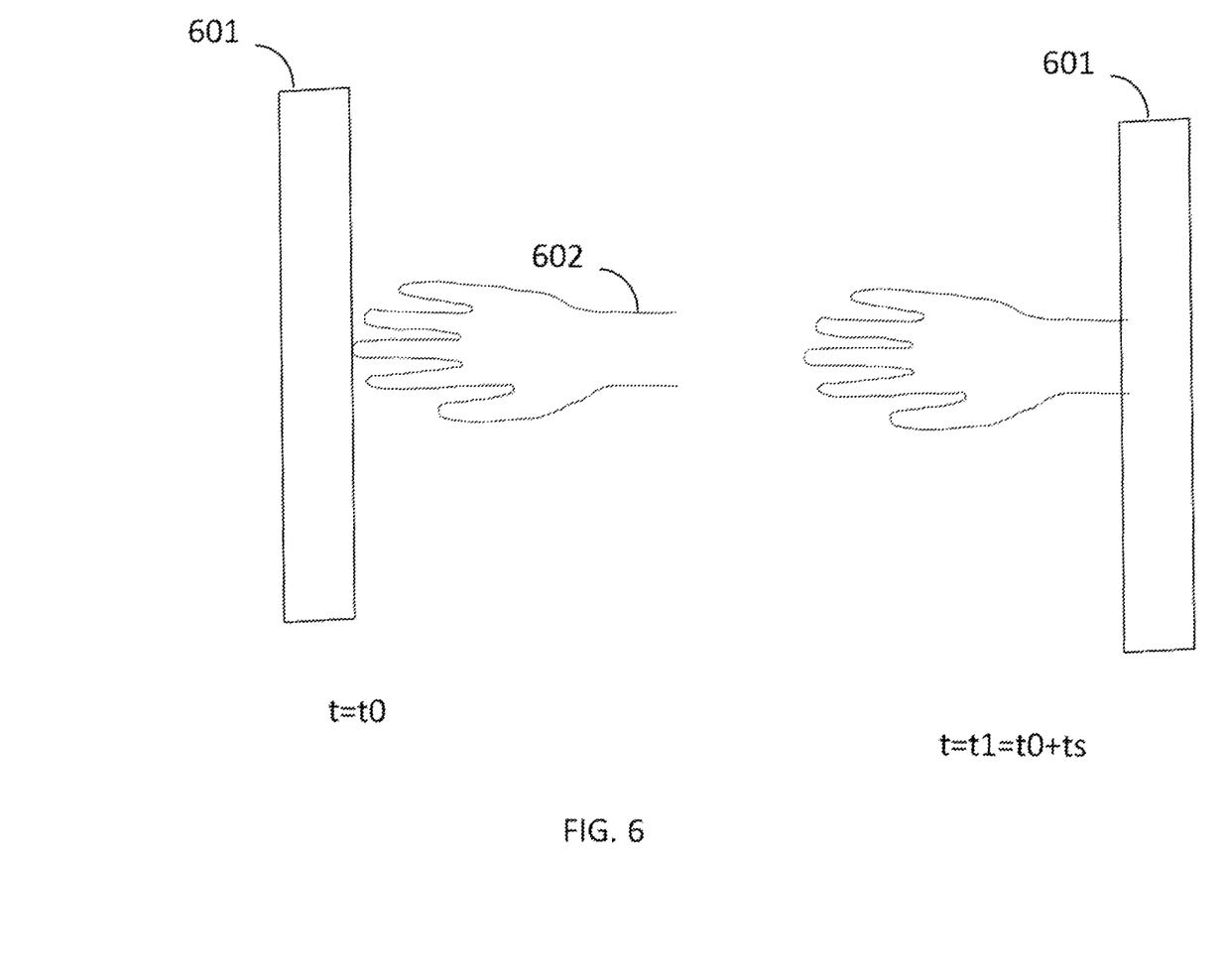
FIG. 6 is a schematic illustration of a process of manufacturing seamless polyethylene based gloves according to an embodiment of the present invention.

The method may further include rotating each of the plurality of hand molds greater than 90 degrees prior to the withdrawing of the hand mold. For example, the palm side of the hand mold may be facing upward when the hand mold is inserted into the curtain. After a set time has passed, the hand mold may be rotated 90 degrees or greater so that at least a portion of the back side of the hand mold is facing upward. As shown in FIG. 6, the set time ts may correspond to the time duration for the whole length of the hand to travel through the curtain 601 of the molten polyethylene based film, i.e., from the time t0 that the tip of the longest finger of the hand mold 602 comes in contact with the molten polyethylene based film to the time t1 when a desired length along the wrist is in contact with the curtain of the molten polyethylene based film. The set time ts may correspond to the time it takes for an entire length of the hand mold 602 to be in contact with the curtain of the molten polyethylene based film, i.e., the length of the hand mold divided by the speed at which the hand mold travels. In one embodiment, the speed at which the hand mold travels is determined by the desired thickness of the disposable glove.

The seamless polyethylene based glove may have a thickness of about 0.01 mm to about 0.5 mm. For example, the seamless polyethylene based glove may have a thickness of about 0.01 mm to about 0.4 mm, about 0.05 mm to about 0.3 mm, or about 0.05 to about 0.2 mm. In one embodiment, the seamless polyethylene based glove may have a thickness of about 0.06 mm to about 0.08 mm. The seamless polyethylene based glove may have a uniform thickness. The seamless polyethylene based glove may have a weight of about 0.2 g to about 10 g, for example, about 0.5 g to about 3 g, or about 1.8 g to about 2.2 g.

Figure 7:
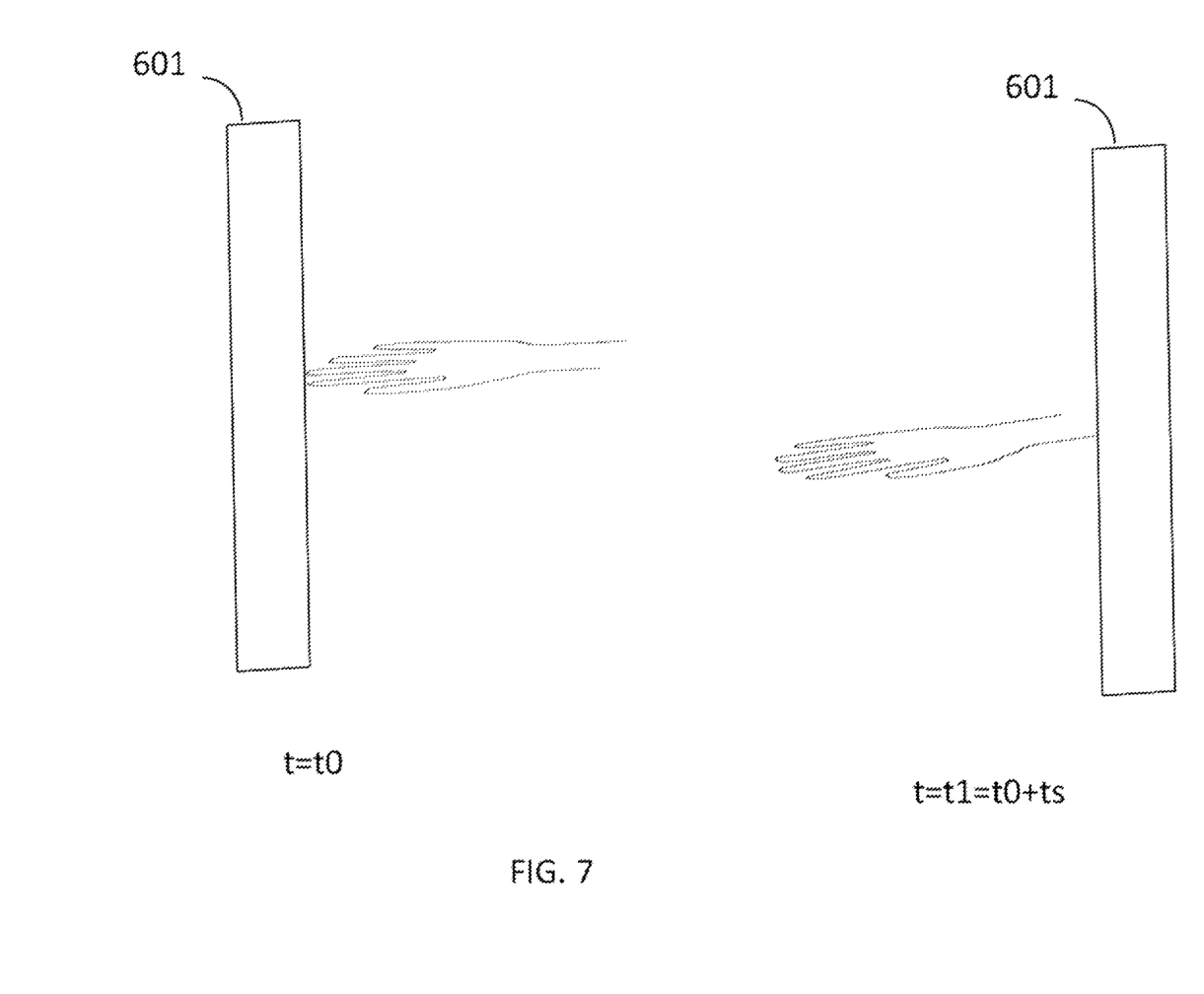
FIG. 7 is a schematic illustration of a process of manufacturing seamless polyethylene based gloves according to an embodiment of the present invention.

Each of the plurality of hand molds may be rotated 180 degrees prior to the withdrawing of the hand mold. As shown in FIG. 7, the palm of the hand mold was facing upward when approaching the curtain of the molten polyethylene based film, and after the set time ts, the hand mold is rotated 180 degrees and it was the back of the hand mold that was facing upward during the withdrawing act. In one embodiment, the hand mold moves at a same speed in approaching and withdrawing from the curtain of the molten polyethylene based film. In another embodiment, the hand mold moves at a first speed when approaching the curtain of the molten polyethylene based film, and moves at a second speed when withdrawing from the curtain of the molten polyethylene based film. The first speed and second speed may be different from each other. For example, the first speed may be slower than the second speed such that a thicker layer of the polyethylene based film is formed on the palm side than on the back side.

While it has been described that the palm side is facing upward when approaching the curtain of the molten polyethylene based film, embodiments of the present invention are not limited thereto. For example, the back side of the hand mold may be facing upward when approaching the curtain of the molten polyethylene based film, and the palm side of the hand mold may be facing upward when withdrawing from the curtain of the molten polyethylene based film.

In another embodiment of the present invention, the hand mold is rotating at a constant speed when approaching and withdrawing from the curtain of the molten polyethylene based film. The hand mold may be rotating at any suitable rate to have the whole hand mold coated with the molten polyethylene based film. For example, the hand mold may be rotating at a speed such that the hand mold rotates 180 degrees or 360 degrees from the time the tip of the longest finger of the the hand mold comes in contact with the molten polyethylene based film during the contacting act to the time the tip of the longest finger of the hand mold just becomes disengaged with the molten polyethylene based film during the withdrawing act.

The polyethylene based material may be selected from low density polyethylene (LDPE), linear low density polyethylene (LLDPE), medium density polyethylene (MDPE), high density polyethylene (HDPE), polyethylene copolymer, and a combination thereof. The seamless polyethylene based glove may further include at least one of polyoxyethylene (POE), polyisobutylene (PIB), ethylene propylene rubber (EPR), ethylene propylene diene elastomer (EPDM), EPDM by metallocene catalyst, and combinations thereof.

In one embodiment, the seamless polyethylene based glove may be made of a blend of LDPE and LLDPE. In another embodiment, the seamless polyethylene based glove may be made of a blend of LDPE, LLDPE, POE and EPDM rubber by metallocene catalyst.

The method may further include solidifying the molten polyethylene based material on the hand mold. The molten polyethylene based material may be solidified on the hand mold with cooling from an external source, such as cold air circulation around the hand mold, or through a temperature difference between the curtain of the molten polyethylene based film and the hand mold. For example, the molten polyethylene based film may have a first temperature Tp, and the hand mold may have a second temperature Th. A temperature difference Td between the temperature of the molten polyethylene based material Tp and the temperature of the hand mold Th may be about 2 to 100° C. In one embodiment, the temperature difference may be about 20 to about 70° C. If the temperature difference Td between the temperature of the molten polyethylene based material Tp and the temperature of the hand mold Th is more than 100° C., the polyethylene based material may solidify on the hand mold during the inserting and withdrawing act, and non-uniform film formation may happen, which may lead to lower strength in the formed glove. If the temperature difference Td between the temperature of the molten polyethylene based material Tp and the temperature of the hand mold Th is less than 2° C., the polyethylene based film may not solidify fast enough after the hand mold is withdrawn from the curtain.

The hand mold may include an inner chamber enclosed by a surface of the hand mold; the inner chamber may include a heater, such as heating coils or heated fluid at a set temperature.

The hand mold may be made of a metal material. The metal material may be copper or aluminum. However, the hand mold is not limited thereto and may be made of any suitable materials, such as polymer material and/or ceramic materials.

The method may further include removing the solidified polyethylene based material from the hand mold, thereby completing the manufacturing of a seamless polyethylene based glove.

The hand mold may include a layer of a glove material on its surface. The glove material may be selected from woven fabric, non-woven fabric, polyvinyl alcohol, PVC, nitrile, latex, feather, styrene-butadiene copolymer (SBC), ethylene vinyl acetate (EVA), other ethylene based material (e.g., a copolymer including an ethylene block), and combinations thereof. Upon removal from the hand mold, the gloves may include a layer of the polyethylene based material, multiple layers of polyethylene based material having the same or different composition, or multiple layers including one or more layers of the glove material and one or more layers of the polyethylene based materials.

The curtain of polyethylene based material may have a first width, and the hand mold may have a second width, wherein a number of the hand molds spaced apart in a horizontal row is equal to or less than a quotient of the first width and the second width.

Figure 8:
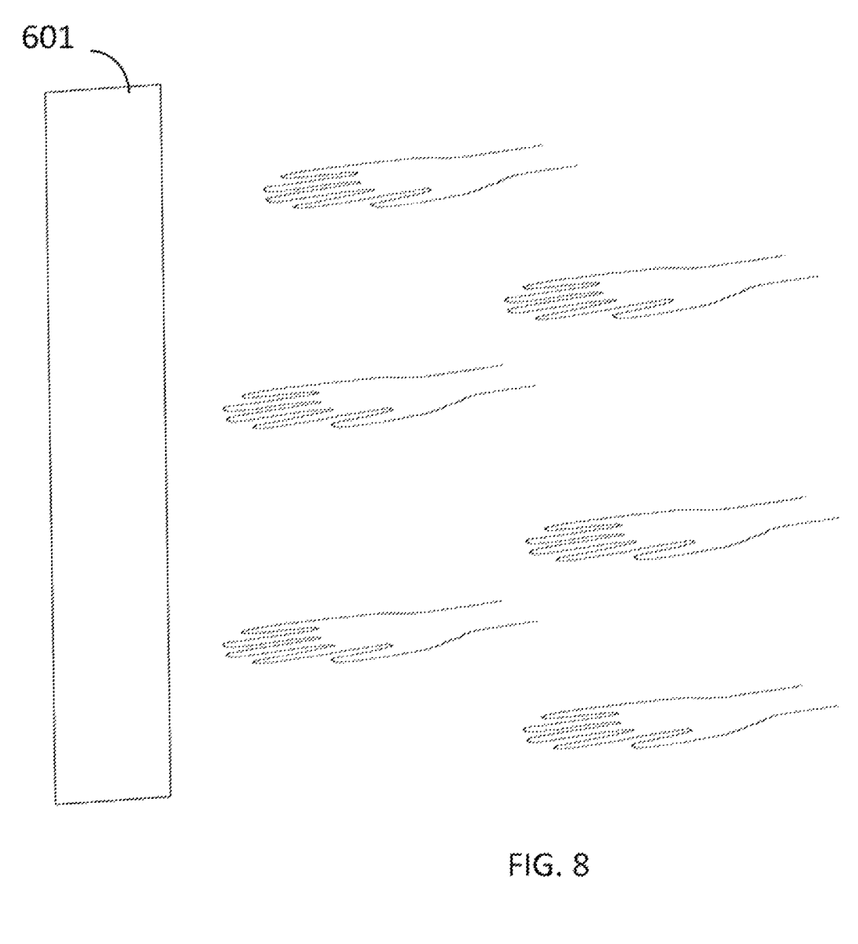
FIG. 8 is a schematic illustration of a process of manufacturing seamless polyethylene based gloves according to an embodiment of the present invention.

The plurality of hand molds may be arranged in two or more horizontal rows, or two or more vertical columns. As shown in FIG. 8, the two or more rows or columns of the hand molds may be arranged in a staggered pattern.

A surface of the hand mold may be textured. The whole surface of the hand mold may be textured, or only a portion of the surface of the hand mold may be textured. For example, only the fingertips may be textured while the rest of the gloves have a smooth surface.

The extruder and/or any other relevant manufacturing devices or components according to embodiments of the present invention described herein may be implemented utilizing any suitable hardware, firmware (e.g. an application-specific integrated circuit), software, or a combination of software, firmware, and hardware. For example, the various components of the extruder and/or any other relevant manufacturing devices may be formed with one integrated circuit (IC) chip or on separate IC chips. Further, the various components of the device may be implemented on a flexible printed circuit film, a tape carrier package (TCP), a printed circuit board (PCB), or formed on one substrate. Further, the various components of the device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

While polyethylene based materials have been described for making seamless disposable gloves utilizing the methods according to one or more embodiments of the present invention, embodiments of the present invention are not limited thereto. For example, the seamless gloves may be for other purposes rather than for disposable gloves. Also, other suitable materials, such as other thermoplastic materials, for example, polypropylene based materials, may be utilized to make gloves utilizing the methods described above.

While one or more embodiments of the present invention have been described with reference to the figures, it will be understood by those of ordinary skill in the art that various changes in form and details may be made therein without departing from the spirit and scope of the present invention as defined by the following claims, and equivalents thereof.

What is claimed is:

1. A seamless polyethylene based glove, comprising at least 55 wt % of polyethylene, wherein the glove has a uniform elastic modulus throughout the glove.

2. The seamless polyethylene based glove of claim 1, wherein the glove has a thickness of about 0.01 mm to about 0.5 mm.

3. The seamless polyethylene based glove of claim 1, wherein the glove has a uniform thickness.

4. The seamless polyethylene based glove of claim 1, wherein the glove is configured to sustain a load of about 1200 g water in a pinhole test.

5. The seamless polyethylene based glove of claim 1, wherein the glove is configured to sustain a load of about 2000 g water in a pinhole test.

6. The seamless polyethylene based glove of claim 1, wherein the glove comprises a material selected from the group consisting of low density polyethylene (LDPE), linear low density polyethylene (LLDPE), medium density polyethylene (MDPE), high density polyethylene (HDPE), polyethylene copolymer, and combinations thereof.

7. The seamless polyethylene based glove of claim 6, further comprising at least one selected from polyoxyethylene (POE), polyisobutylene (PIB), ethylene propylene rubber (EPR), ethylene propylene diene elastomer (EPDM), EPDM by metallocene catalyst, and combinations thereof.

8. The seamless polyethylene based glove of claim 6, wherein the glove comprises a blend of LDPE and LLDPE.

9. The seamless polyethylene based glove of claim 7, wherein the glove comprises a blend of LDPE, LLDPE, POE and EPDM.

10. The seamless polyethylene based glove of claim 1, wherein the glove further comprises an additive.

11. The seamless polyethylene based glove of claim 10, wherein the additive comprises a pigment, an antimicrobial agent, a processing aid, and/or a UV stabilizer.

12. The seamless polyethylene based glove of claim 1, wherein the glove has a texture on at least a portion of the glove.

13. The seamless polyethylene based glove of claim 1, wherein the glove includes 5 fingers, or is in the shape of a mitten with one thumb.

14. The seamless polyethylene based glove of claim 1, wherein the glove comprises two or more layers of materials.

15. The seamless polyethylene based glove of claim 1, wherein the glove comprises a layer of woven fabric, non-woven fabric, polyvinyl alcohol, PVC, nitrile, latex, feather, styrene-butadiene copolymer (SBC), ethylene vinyl acetate (EVA), and combinations thereof.

16. A method of manufacturing seamless thermoplastic material based disposable gloves, the method comprising:
    forming a curtain of molten thermoplastic material based material;

inserting a plurality of hand molds into the curtain of molten thermoplastic material based material;

rotating each of the plurality of hand molds greater than 90 degrees, and withdrawing the hand molds from the curtain of molten thermoplastic material based material, wherein one of the palm side or the back side of each of the plurality of hand molds remains facing upward during the entire period of the inserting of the plurality of hand molds, and the other one of the palm side or the back side of each of the plurality of hand molds remains facing upward during the entire period of the withdrawing of the plurality of hand molds, wherein the thermoplastic material comprises at least 55 wt % of polyethylene, and wherein the glove has a uniform elastic modulus throughout the glove.

17. The method of claim 16, wherein the thermoplastic material is selected from the group consisting of acrylics, fluorocarbons, polyurethane, polystyrene, acrylonitrile butadiene styrene (ABS), polyamide, polylactic acid, polycarbonate, polyether sulfone, polyetherimide, polyolefin, polyvinyl chloride, and combinations thereof.

18. The method of claim 16, wherein the thermoplastic material is polyethylene.

19. The method of claim 18, wherein the rotating of each of the plurality of hand molds greater than 90 degrees is conducted only after the inserting and only prior to the withdrawing of the hand mold.

20. The method of claim 18, wherein each of the plurality of hand molds is rotated 180 degrees prior to the withdrawing of the hand mold.

21. The method of claim 18, wherein the polyethylene based material is selected from the group consisting of low density polyethylene (LDPE), linear low density polyethylene (LLDPE), medium density polyethylene (MDPE), high density polyethylene (HDPE), polyethylene copolymer, and combinations thereof.

22. The method of claim 18, wherein a temperature difference between a temperature of the molten polyethylene based material and a temperature of the hand mold is about 2 to 100° C.

23. The method of claim 18, wherein the method further comprises solidifying the molten polyethylene based material on the hand mold.

24. The method of claim 18, wherein the hand mold includes a layer of a glove material.

25. The method of claim 24, wherein the glove material is selected from the group consisting of woven fabric, non-woven fabric, polyvinyl alcohol, PVC, nitrile, latex, feather, styrene-butadiene copolymer (SBC), ethylene vinyl acetate (EVA), and combinations thereof.

26. The method of claim 18, further comprising removing the solidified polyethylene based material from the hand mold.

27. The method of claim 18, wherein the plurality of hand molds are arranged in two or more horizontal rows.

28. The method of claim 27, wherein the two or more rows of the hand molds are arranged in a staggered pattern.

29. The method of claim 18, wherein the hand mold may include an inner chamber enclosed by a surface of the hand mold, the inner chamber including a heater.

30. The method of claim 18, wherein the hand mold is made of a metal material.

31. The method of claim 18, wherein a surface of the hand mold is textured.

32. The method of claim 16, wherein the inserting of the plurality of hand molds has a first linear speed, and the withdrawing of the hand molds has a second linear speed different from the first linear speed.

* * * * *